(12) United States Patent
Reilly

(10) Patent No.: US 6,427,164 B1
(45) Date of Patent: Jul. 30, 2002

(54) SYSTEMS AND METHODS FOR AUTOMATICALLY FORWARDING ELECTRONIC MAIL WHEN THE RECIPIENT IS OTHERWISE UNKNOWN

(75) Inventor: Robert H. Reilly, Pleasant Hill, CA (US)

(73) Assignee: Mail Registry, Inc., San Francisco, CA (US)

( * ) Notice: Subject to any disclaimer, the term of this patent is extended or adjusted under 35 U.S.C. 154(b) by 0 days.

(21) Appl. No.: 09/338,834

(22) Filed: Jun. 23, 1999

(51) Int. Cl.[7] .............................................. G06F 15/16
(52) U.S. Cl. ........................ 709/206; 709/207; 709/203
(58) Field of Search ................................ 709/206, 207, 709/203

(56) References Cited

U.S. PATENT DOCUMENTS

| | | | |
|---|---|---|---|
| 5,493,564 A | * | 2/1996 | Mullan .................. 340/825.53 |
| 5,581,757 A | * | 12/1996 | Maxey ........................ 358/402 |
| 5,632,018 A | * | 5/1997 | Otorii ......................... 709/200 |
| 5,717,742 A | | 2/1998 | Hyde-Thomson |
| 5,732,126 A | | 3/1998 | Fitzpatrick et al. |
| 5,734,901 A | | 3/1998 | Sidhu et al. |
| 5,737,395 A | | 4/1998 | Irribarren |
| 5,751,960 A | | 5/1998 | Matsunaga |
| 5,752,059 A | | 5/1998 | Holleran et al. |
| 5,754,778 A | | 5/1998 | Shoujima |
| 5,757,901 A | | 5/1998 | Hiroshige |
| D395,044 S | | 6/1998 | Morioka et al. |
| 5,764,898 A | | 6/1998 | Tsuji et al. |
| 5,765,170 A | * | 6/1998 | Morikawa ...................... 707/1 |
| 5,765,178 A | | 6/1998 | Tanaka |
| 5,771,355 A | | 6/1998 | Kuzma |
| 5,781,901 A | | 7/1998 | Kuzma |
| 5,790,649 A | | 8/1998 | Hiroshige |
| 5,805,810 A | | 9/1998 | Maxwell |
| 5,805,811 A | | 9/1998 | Pratt et al. |
| 5,809,242 A | | 9/1998 | Shaw et al. |
| 5,812,278 A | | 9/1998 | Toyoda et al. |

(List continued on next page.)

OTHER PUBLICATIONS

Graybook Home Page, website [online], [retrieved on Jan. 14, 1999], retrieved from the Internet: <URL:www.graybook.com>, 5 pages.

Find mE–Mail, website [online] 1996–1997 Find mE–Mail Inc., [retrieved on Jan. 14, 1999] retrieved from the Internet: <URL: www.findmemail.com>, 5 pages.

All About Administering NIS +, online guide, [retrieved on Jan. 14, 1999], retrieved from the Internet: <URL:www.sun-.com/books/catalog/Ramsey>, 11 pages.

Solaris 1.x to Solaris 2.x Transition Guide, online, [retrieved on Jan. 14, 1999], retrieved from the Internet: <URL:www.sun.com/smcc/solaris–mig–>, 5 pages.

*Primary Examiner*—Krisna Lim
(74) *Attorney, Agent, or Firm*—Townsend and Townsend and Crew LLP; Gerald T. Gray

(57) ABSTRACT

Systems and methods for automatically determining if the recipient of electronic mail that is unknown at the receiving server has left a "forwarding address" with a forwarding address server, thereby allowing either the receiving server, the sending server, or the sending user (computer system), or any other party to the communication, to automatically send the electronic mail content to the correct new address. In addition to this automatic "forwarding", the sending user is notified as to the new electronic mail address so as to allow the sending user to update manually, or automatically, the user's individual database of electronic mail addresses.

21 Claims, 2 Drawing Sheets

U.S. PATENT DOCUMENTS

| | | |
|---|---|---|
| 5,812,770 A | 9/1998 | Sakai |
| 5,818,447 A | 10/1998 | Wolf et al. |
| 5,819,172 A | 10/1998 | Campana et al. |
| 5,826,022 A | 10/1998 | Nielson |
| 5,826,269 A | 10/1998 | Hussey |
| 5,832,218 A | 11/1998 | Gibbs et al. |
| 5,835,762 A | 11/1998 | Gans et al. |
| 5,841,982 A | 11/1998 | Brouwer et al. |
| 5,844,969 A | 12/1998 | Goldman et al. |
| 5,937,161 A | 8/1999 | Mulligan et al. |
| 6,108,691 A * | 8/2000 | Lee et al. .................... 709/206 |
| 6,122,632 A * | 9/2000 | Botts et al. ..................... 705/1 |
| 6,138,146 A * | 10/2000 | Moon et al. ................. 709/206 |
| 6,157,945 A * | 12/2000 | Balma et al. ................ 345/733 |
| 6,202,086 B1 * | 3/2001 | Maruyama et al. ......... 358/434 |
| 6,212,552 B1 * | 4/2001 | Biliris et al. ................ 709/206 |
| 6,185,605 B1 * | 6/2001 | Kowaguchi .................. 709/206 |
| 6,314,454 B1 * | 11/2001 | Wang et al. ................. 358/402 |
| 6,324,587 B1 * | 11/2001 | Trenbeath et al. .......... 709/206 |

\* cited by examiner

SYSTEMS AND METHODS FOR AUTOMATICALLY FORWARDING ELECTRONIC MAIL WHEN THE RECIPIENT IS OTHERWISE UNKNOWN

BACKGROUND OF THE INVENTION

The present invention relates generally to the field of electronic mail management systems, and more specifically to new and useful methods, apparatus and computer programs for automatically forwarding electronic mail to an intended recipient when the recipient is otherwise unknown to the receiving entity.

The national and international packet switched public network, generically referred to as "the Internet" has existed for some time. Although often referred to as a single technological entity, the Internet is represented by a substantial complex of communication systems ranging from conventional analog and digital telephone lines through fiber optic, microwave and satellite communications links. The physical structure of the Internet is logically unified through the establishment of common information transport protocols, and addressing and resource referencing schemes that allow quite disparate computer systems to communicate both locally and internationally with one another.

Electronic mail over the Internet provides a quick and convenient way for computer users to communicate. This communication is typically initiated by a message sender who composes a message using a text editing program, provides the electronic mail address of the intended recipient, and often provides an indication of the content (subject matter) of the message by providing text in a "subject" field. Using well-understood technology, this composed message is then sent to the recipient's computer address. The recipient's computer receives the message and stores it in the recipient's inbox. The recipient eventually reads, deletes, responds to, or otherwise processes the message stored within the inbox by using any of a number of electronic mail programs well known in the art.

Because such electronic mail messages travel across networks, they generally are constructed according to the Standard for the Format of ARPA Internet Text Messages specification (RFC822). This specification can be found on the world wide web of the Internet at address "http://www.cis.ohio-state.edu/htbin/rfc/rfc822.html". Messages formatted to the RFC822 standard have a header portion and an optional body portion that contains the text of the message. The header portion includes a number of fields that address and classify the message. For example, the header portion of a message contains fields composed of character strings comprising a field-name followed by a colon, followed by a field-body terminated with a carriage return/line feed. An example header field is:

"To: John Doe". {cr}{1f}

In this example, the {cr} represents the ASCII carriage return character and the {1f} represents the ASCII line feed character. The header field-names are not case sensitive, thus, "to:" is equivalent to "TO:", "To:" or "tO:".

Today electronic mail service is typically provided by an electronic mail server connected to the Internet. Another dynamic information source is provided by independently operating list servers residing on computer systems that are, in general, connected to the Internet. A list server is typically an automated service that functions autonomously to repeat electronic mail messages received by a publicly-known list server electronic mail account to an established list of subscribers known to the list server by explicit or fully qualified electronic mail addresses. The list server is thus an automated electronic/relectronic mailer that allows a one-to-many distribution of electronic mail messages through the operation of the list server. The relectronic mailing of electronic mail messages is typically dynamic and, therefore, persistent messages are maintained, if at all, selectively by the subscribers of a particular mailing list. Furthermore, the list servers are themselves subject to extreme variability in location and operation since only a publicly available dedicated electronic mail address is required in substance to operate a list server.

Currently, when electronic mail is sent, it is packaged in various formats and sent from the sending user's computer system to an electronic mail server (sending server), via various means of electronic transmission, and a copy is generally retained on the sending machine. The sending server then packages the message into simple mail transfer protocol (SMTP) format, or Interim Mail Access Protocol (IMAP) format, or other electronic mail protocol formats, using Multipurpose Internet Mail Extensions (MIME) or Hypertext Markup Language (HTML) or other formatting protocols, and a connection is attempted with the recipient.

During this connection, the electronic mail message is sent from the sending server to a receiving server associated with the recipient of the message. In order to accept the electronic mail content from the sending server, the receiving server must generally be able to validate that there is indeed a user name corresponding exactly with the electronic mail recipient's name. The receiving server thus checks its database of electronic mail users and validates the electronic mail recipient's name (the part of the electronic mail address before the @ sign). If the recipient's name is not validated, the receiving server generally refuses the electronic mail content and returns an error message indicating that the recipient is "unknown". One general exception to the foregoing is a receiving server which accepts all the mail for a domain ("mail-bagging"), in which case only the domain name is checked and all recipient mail content is accepted, to be validated at a later time (usually) by another server.

When the sending server receives the error message stating that the recipient is "unknown", it generally sends a message back to the sending user that the recipient is unknown. This is typically the end of any automatic electronic mail service session. The sending user must interpret the error message (sent in various text and formats) and decide how to proceed.

The ability to change electronic mail addresses expediently has not kept pace with the rapid expansion of the Internet. As a result, many electronic mail users feel that they cannot leave their existing Internet Service Provider (ISP) because when and if they do, the ISP will erase their electronic mail name from the electronic mail server. All the mail that would be sent to them at that address would therefore be returned "user unknown". It would take many hours to change all manual and automatic electronic mail addresses from the old address to the new address. Many of the users who do indeed change ISPs are forced to retain the old ISP service for several months until they are sure that all of their electronic mail is being sent to the correct address.

SUMMARY OF THE INVENTION

The present invention provides systems and methods for automatically determining if the recipient of electronic mail that is unknown at the receiving server has left a "forwarding address" with another server (the "forwarding listserver"), thereby allowing either the receiving server, the sending server, or the sending user (e.g., computer system), or any other party to the communication, to automatically send the electronic mail content to the (new) correct address. In addition to this automatic "forwarding", the sending user is notified as to the new electronic mail address so as to allow the sending user to update manually, or automatically via specialized software, the user's individual database of electronic mail addresses. No attempt is made to resolve an unknown user name to any of the existing user names that might be close in spelling. This would be a major security breach and go against most of the philosophy in the electronic mail concept.

The present invention provides that some or all participants in the electronic mail process (the sending user, the sending server, the receiving server, the receiving user, and any other participant) are aware that there is an entity, the "forwarding listserver", which may have on file and available to an electronic mail participant, the new address for a particular username which is unknown to a receiving server. This new address is supplied by the electronic mail user who is changing their electronic mail address (or their employer, or any other concerned party) and is organized in a commercially available database on the "forwarding listserver". Alternately, the new address can be supplied by any other entity, such as the user's new ISP after it receives from the user their previous e-mail address(es).

The "forwarding listserver" includes the forwarding information (old electronic mail name and new electronic mail name). The "forwarding listserver" stores each set of data for a period of time, at the end of which the data is either renewed or purged (manually or automatically). Additionally, other forwarding data can be stored, such as a new postal mail address, new phone number, and other items of data. This data could be promulgated based on a variety of criteria, or be available to the Internet at large.

The manipulations performed by a computer, such as a server or a home or office computer system, in executing computer instructions are often referred to in terms, such as adding or comparing, that are commonly associated with mental operations performed by a human operator. No such capability of a human operator is necessary in any of the operations described herein that form part of the present invention; the operations are machine operations. Useful machines for performing the operations of the invention include programmed general purpose digital computers or similar devices. In all cases the method of computation is distinguished from the method of operation in operating a computer. The present invention relates, in part, to method steps for operating a computer in processing electrical or other (e.g., mechanical, chemical, optical) physical signals to generate other desired physical signals. These steps are those requiring physical manipulation of physical quantities. Usually these quantities take the form of electrical or magnetic signals capable of being stored, transferred, combined, compared, and otherwise manipulated. These signals are referred to as bits, values, elements, symbols characters, terms, numbers, or the like. It will be understood by those skilled in the art that all of these and similar terms are associated with the appropriate physical quantities and are merely convenient labels applied to these quantities.

The invention also relates to apparatus for performing these operations. This apparatus may be specially constructed for the required purposes or it may comprise a general purpose computer as selectively activated or reconfigured by a computer program stored in a memory. The procedures presented herein are not inherently related to a particular computer or other apparatus. In particular, various general purpose machines may be used with programs written in accordance with the teachings herein, or it may prove more convenient to construct more specialized apparatus to perform the operations. The general required structure for a variety of these machines will appear from the description below. Additionally, the invention may be embodied in a computer readable medium encoded with an electronic mail application program or other application program.

According to an aspect of the invention, a method is provided for automatically resending an electronic message originally sent to a receiving user at a first address that is now invalid to a second address for the receiving user, wherein the second address has been registered with a forwarding server. The method typically comprises the steps of sending an electronic message from a first electronic mail domain to the first address at a second electronic mail domain, determining in the second domain that the first address is no longer valid, and automatically sending a query from the second domain to the forwarding server to determine a new address associated with the first address, wherein the forwarding server stores the first address in association with the second address. The method also typically includes the steps of returning the second address to the second domain, and thereafter automatically sending the electronic message to the second address.

According to another aspect of the invention, a method is provided for automatically resending an electronic message originally sent to a receiving user at a first address that is now invalid to a second address for the receiving user, wherein the second address has been registered with a forwarding server. The method typically comprises the steps of sending an electronic message from a first electronic mail domain to the first address at a second electronic mail domain, returning a message to the first domain indicating that the first address is no longer valid, and automatically sending a query from the first domain to the forwarding server to determine a new address associated with the first address, wherein the forwarding server stores the first address in association with the second address. The method also typically includes the steps of returning the second address to the first domain, and thereafter automatically sending the electronic message to the second address.

According to yet another aspect of the present invention, a method is provided for automatically resending an electronic message originally sent to a receiving user at a destination address that is now invalid to a new address for the receiving user, wherein the new address has been registered with an address server. The method typically comprises the steps of creating an electronic message on a computer system, the electronic message having a first destination address, sending the electronic message to a first server, sending the electronic message from the first server to a second server associated with the destination address, determining in the second server that the destination address is not valid, and thereafter automatically sending a query to the address server to determine a new address associated with the destination address, wherein the address server stores the destination address in association with the new address. The method also typically includes the steps of returning the new address, and thereafter automatically sending the electronic message to the new address.

According to a further aspect of the present invention, an address server is provided. The address server typically includes an address database for storing old e-mail addresses in association with new e-mail addresses for registered users. When the address server receives a query from an e-mail server requesting a new e-mail address associated with an old e-mail address for a first user, if the first user is registered with the address server, the server searches the database for the old address and returns the new address for the first user to the e-mail server.

According to yet a further aspect of the invention, an e-mail server for receiving and sending electronic messages is provided. The e-mail server is configured to automatically send a request to an address server, which stores old e-mail addresses in association with new e-mail addresses for registered users, when the e-mail server receives a first electronic message from a first computer for a destination address that is no longer valid, and wherein the request requests a new address associated with the destination address.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein.

DESCRIPTION OF THE SPECIFIC EMBODIMENTS

Figure 1:
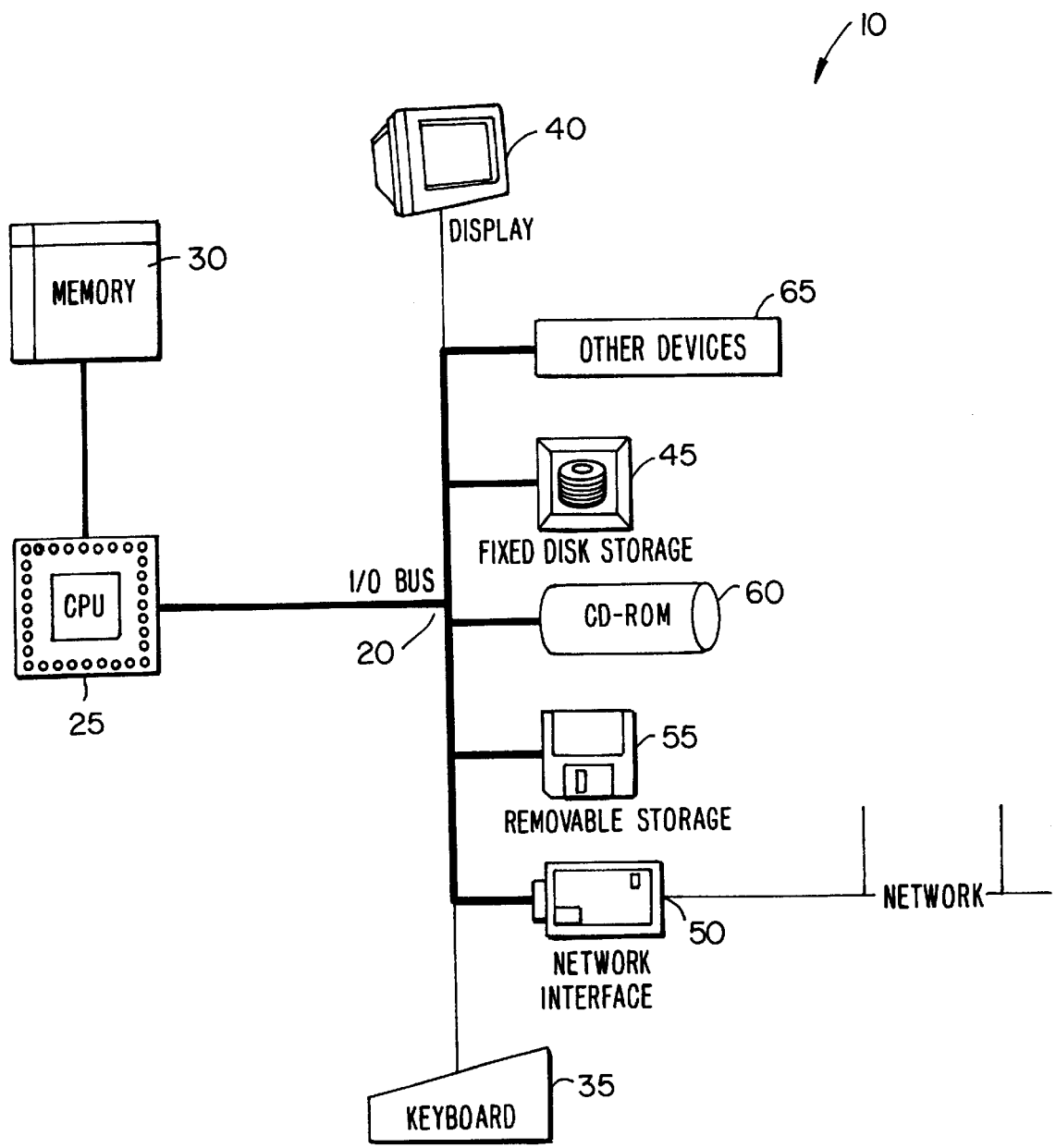
FIG. 1 illustrates an exemplary computer system for executing electronic mail programs that embody the invention.

FIG. 1 illustrates an exemplary computer system 10 for executing electronic mail (e-mail) programs and other programs that embody the invention. Computer system 10 includes an Input/Output ("I/O") bus 20, a central processing unit ("CPU") 25 and a memory section 30. I/O bus 20 provides a connection to a keyboard 35, a display unit 40, a disk storage unit 45, a network interface 50, a removable storage 55, a CD-ROM drive unit 60 and numerous other peripheral devices 65, such as a mouse, a modem, a scanner, etc. CD-ROM unit 60 reads a CD-ROM medium that typically contains programs and data.

Figure 2:
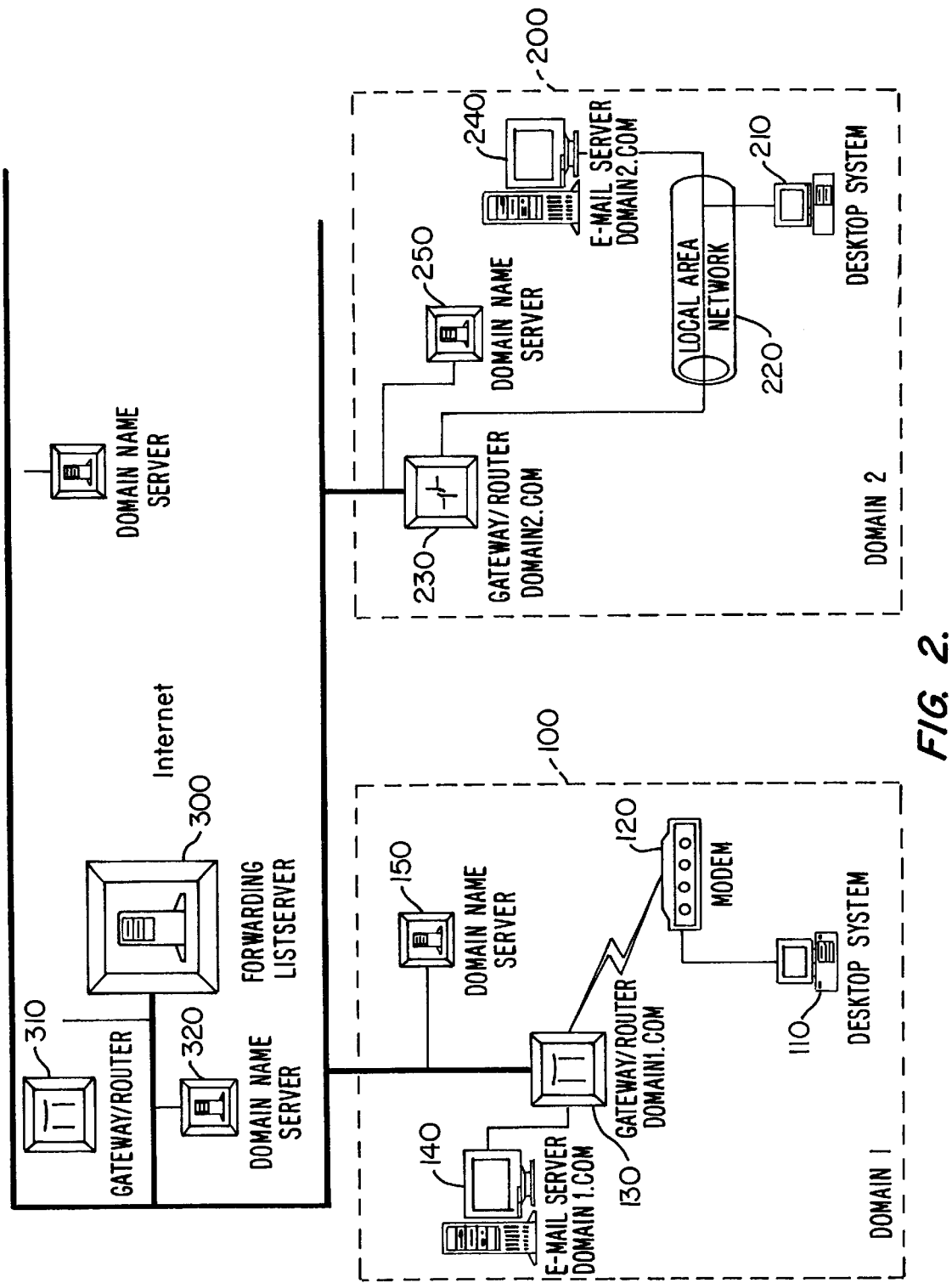
FIG. 2 illustrates an exemplary network structure according to the present invention.

FIG. 2 illustrates an exemplary network structure according to the present invention. Local domain 100 (domain 1) is communicably coupled to multiple domains, including domain 200 (domain 2), over the Internet. Local domain 100 includes a computer system 110 (similar to computer system 10 of FIG. 1) coupled to a modem 120. Modem 120 provides a communication connection to gateway/router 130. Alternately, computer system 110 is directly connected to gateway/router 130 over a network, such as a local area network (LAN), wide area network (WAN) or the like. Gateway/router 130 provides an Internet connection, and is connected to local e-mail server 140 (domainl.com) and to local domain name server 150. Second domain 200 (domain 2) includes a computer system 210 connected to second gateway/router 230 and second e-mail server 240 (domain2.com) over LAN 220. Gateway router 230 is connected to second domain name server 250.

Forwarding address server 300 is communicably coupled to domain 1 and domain 2 over the Internet as shown in FIG. 2. Gateway/router 310 and domain name server 320 are optionally provided to add functionality to forwarding server 300. As shown, forwarding server 300 is preferably located in an Internet domain remote from domain 1 and domain 2, however, forwarding server 300 may be located in domain 1 or domain 2. Forwarding server 300 preferably includes a database of new Internet addresses associated with old addresses for users that have registered these addresses with forwarding server 300 either directly or indirectly, for example, through a new ISP. To register with forwarding server 300, all that is required is that a new address and an old address be provided to forwarding server 300. Forwarding server 300 preferably stores new e-mail addresses in a table in association with old addresses, although any data structure as is well known can be used.

It be apparent to one skilled in the art that FIG. 2 is merely an illustrative example of a network structure for sending, receiving and resending e-mail messages according to the present invention. Any other network structure can be used without departing from the spirit of the invention. Additionally, it will be apparent to one skilled in the art that the present invention is not limited to implementation with any particular email server software or client software to perform the functions disclosed herein.

Suppose now that a typical user (e.g., user1@domain1.com) using computer system 110 in local domain 100 desires to send an e-mail message to another user (e.g., user2@domain2.com) at second domain 200. Using one of many various e-mail software clients, the first user composes a message and addresses the message to the intended recipient, user2@domain2.com (as per RFC 821 and RFC 822, as amended).

In a preferred embodiment of the present invention, the RFC822 protocol is used to construct electronic mail messages. The RFC822 specification can be found on the world wide web of the Internet at address "http://www.cis.ohio-state.edu/htbin/rfc/rfc822.html", and is incorporated by reference for all purposes. However, the present invention does not require the use of the RFC822 standard, so long as there exists a method to identify essential addressing information and associated data. This essential information includes, for example, identification of the message recipient(s) and a subject field for the message.

The client e-mail software resident on computer system 110 packages the message text and/or attachments in proper e-mail format and sends the e-mail message through modem 120 and router/gateway 130 to the e-mail server 140 for local domain 100 (domain1). Alternately, the e-mail message is sent over a network to e-mail server 140. E-mail server 140 for domainl queries an Internet Name Service (local hosts table, Internet Domain Name Server 150, or various directory services) to resolve the destination domain name into an IP address, for example domain2.com for second domain 200 (domain2). When this is successfully accomplished, e-mail server 140 sends the message to the Internet, addressed to the IP address for second domain 200 (e.g., domain2.com), asking for a connection. At this point the message address can be generally represented as follows: DestinationUsername@DomainName.

This message goes first to gateway/router 130, which sends the message to second gateway/router 230 associated with second domain 200 through the various connections on the Internet. When second gateway/router 230 receives the message, it ascertains whether the IP address is associated with second domain 200, e.g., whether the destination e-mail server is located on local area network 220. If so, gateway/router 230 sends the message to e-mail server 240 for second domain 200. Generally, e-mail server 240 checks its internal table of domain names (the data after the @ sign) to see if it is the proper destination for that e-mail message. If this is true, e-mail server 240 checks the destination username (the data before the @ sign) to determine whether the destination username is included in the internal table of names (and aliases). If so, e-mail server 240 accepts the connection from e-mail server 140 and the entire e-mail message (text and/or attachments) is sent from e-mail server 140 and received by e-mail server 240. E-mail server 140 then typically changes the message status (internally) from an "outgoing" status to a "sent" status, and e-mail server 240 typically moves the incoming message (internally) from a temporary storage area to an area ("local mailbox") for the second user's (user2@domain2.com) local retrieval and disposition. The second user connects at various times to e-mail server 240 from a computer, such as computer system 210, using one of many e-mail software clients, and retrieves the e-mail message. The message may or may not be copied to the computer system 210, and may or may not be deleted from the e-mail server 240.

According to one embodiment, if the destination username is not found in the internal table of names (and aliases), e-mail server 240 sends a message to the sending e-mail server 140 indicating that the address is invalid (e.g., the user does not exist). This message is generally referred to as a "non-delivery report" (NDR). Sending e-mail server 140 then generally places this NDR message in User1's mailbox area as a new message, possibly adding an explanation of the problem and other text, informing User1 that the e-mail could not be delivered due to the non-existence of the username on the destination e-mail server. At this point, User1 knows only that the e-mail message has not been delivered. The username for User2 may have been deleted from the list of users on the Domain2 e-mail server 240 for any one of many reasons. An example of an NDR is an Undeliverable Mail Notification Message (From RFC 821) as follows:

S: MAIL FROM
  R: 250 ok
  S: RCPT TO <@HOSTX.ARPA:JOE@HOSTW.ARPA>
  R: 250 ok
  S: DATA
  R: 354 send the mail data, end with.
  S: Date: October 23, 81 11:22:33
  S: From: SMTP@HOSTY.ARPA
  S: To: JOE@HOSTW.ARPA
  S: Subject: Mail System Problem
  S:
  S: Sorry JOE, your message to SAM@HOSTZ.ARPA lost.
  S: HOSTZ.ARPA said this:
  S: "550 No Such User"
  S:
  R: 250 ok There are some cases where the destination information is incorrect, but the receiving server knows the correct destination. In such cases, one of the following replies can be used to allow the sending server to contact the correct destination.

251 User not local; will forward to <forward-path>

This reply indicates that the receiving server knows the user's mailbox is on another host server and indicates the correct forward-path to use in the future. Note that either the host or user or both may be different. The receiving server generally takes responsibility for delivering the message.

551 User not local; please try <forward-path>

This reply indicates that the receiving server knows the user's mailbox is on another host server and indicates the correct forward-path to use. Note that either the host or user or both may be different. The receiving server generally refuses to accept mail for this user, and the sending server must either redirect the mail according to the information provided or return an error response to the originating user.

According to one embodiment, if the destination username is not found, receiving e-mail server 240 sends an NDR to sending e-mail server 140. Upon receipt of the NDR, sending e-mail server 140 automatically sends a request to the IP address for the Forwarding server 300, asking for a new e-mail address that corresponds to the old e-mail address. According to this embodiment, e-mail server 140 is preferably configured with the address for forwarding server 300. Forwarding server 300 receives the request, which preferably includes the old e-mail address, and checks its database for any new address associated with the old e-mail address. If User2's new e-mail address has been registered with the forwarding server 300, directly by User2 or through a new ISP, for example, forwarding server 300 looks up and returns the new address to sending e-mail server 140.

Sending e-mail server 140 then automatically resends the e-mail message destined for user2 to the new address. Alternately, sending e-mail server 140 causes the e-mail message to be resent, for example by communicating the new address to receiving e-mail server 240 or computer system 110 with an instruction to resend to the new address. In this example, upon receipt of the instruction and new address, receiving e-mail server 240 or computer system 110 automatically resends the message to the new address.

To register with forwarding server 300, all that is required is that a new address and an old address be submitted. Forwarding server 300 preferably stores new e-mail addresses in a table in association with old addresses, although any data structure as is well known can be used. Additionally, any directory databases including X.500, LDAP, or the like can be used. Thereafter, when a request is received to locate a new address associated with a user's old address, forwarding server 300 searches for the old address and returns the associated new address.

According to another embodiment, when receiving e-mail server 240 identifies that the recipient's username (e.g., old address) is unknown, rather than send an NDR, receiving e-mail server 240 itself automatically sends a request to the IP address for the forwarding server 300 asking for a new e-mail address for the recipient that corresponds to the old e-mail address. Forwarding server 300 receives the request, which preferably includes the old e-mail address, and checks for any new address in its database associated with the old e-mail address. If User2's new e-mail address has been registered with forwarding server 300, directly or through a new ISP, for example, forwarding server 300 returns the new address to receiving e-mail server 240. Receiving e-mail server 240 then automatically resends the e-mail message destined for user2 to the new address. Alternately, receiving e-mail server 240 causes the e-mail message to be resent, for example by communicating the new address to sending e-mail server 140 or computer system 110 with an instruction to resend to the new address. In this example, upon receipt of the instruction and new address, sending e-mail server 140 or computer system 110 automatically resends the message to the new address. If no new address is found, forwarding server 300 returns a message to receiving e-mail server 240 indicating this fact. Receiving e-mail server 240 then sends an NDR to sending e-mail server 140. Additionally, in one embodiment, receiving e-mail server 240 notifies sending e-mail server 140 that forwarding server 300 was queried.

According to another embodiment, if the destination username is not found, receiving e-mail server 240 sends an NDR to sending e-mail server 140. Sending e-mail server 140 then forwards the NDR to computer system 110. Upon receipt of the NDR, computer system 110 automatically sends a request to the IP address for forwarding server 300, asking for a new e-mail address that corresponds to the old e-mail address. Forwarding server 300 receives the request, which preferably includes the old e-mail address, and checks for any new address in its database associated with the old e-mail address. If User2's new e-mail address has been registered with forwarding server 300, directly or through a new ISP, for example, forwarding server 300 returns the new address to computer system 110. Computer system 110 then automatically resends the e-mail message destined for user2 to the new address. Alternately, computer system 110 causes the e-mail message to be resent, for example by communicating the new address to sending e-mail server 140 or receiving e-mail server 240 with an instruction to resend to the new address. In this example, upon receipt of the instruction and new address, receiving e-mail server 240 or sending e-mail server 140 automatically resends the message to the new address.

According to another embodiment, if the destination username is not found, receiving e-mail server 240 sends an NDR, and any other computer or networking entity on the network that detects the NDR automatically sends a query to the IP address for forwarding server 300, asking for a new e-mail address that corresponds to the old e-mail address. When forwarding server 300 receives the request, which preferably includes the old e-mail address, it checks its database for any new address associated with the old e-mail address. If User2's new e-mail address has been registered with forwarding server 300, directly or through a new ISP, for example, forwarding server 300 returns the new address to the requesting entity. The requesting entity then automatically resends the message to the new address, or causes the message to be sent to the new address.

According to another embodiment, in addition to the automatic resending the e-mail message to the new address, the sending user is notified by a new e-mail message or other various means as to the new e-mail address for the recipient. The sending user is then able to manually update their address book with the new address. Alternately, the sending user's e-mail software (or address book, or other reference table) resident on computer system 110 receives the new address and automatically updates the address book with the new e-mail address for the intended recipient (i.e., user2).

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, although the original e-mail message is sent to a different Internet domain, the original message can be sent to a destination user in the same domain. Further, although it is preferred that server 140 or server 240 automatically resends the original message, forwarding address server 300 can automatically send the original electronic message to the intended recipient's new address. Additionally, the invention can be integrated into the e-mail client software on the sender's system, into the e-mail servers' software, or a separate software application, which detects the NDR, queries the forwarding listserver, resends the mail, etc., can reside on the sender's system or any other entity in the network. Therefore, the scope of the appended claims should be accorded the broadest interpretation so as to encompass all such modifications and similar arrangements.

What is claimed is:

1. A method of automatically resending an electronic message originally sent to a receiving user at a first address that is now invalid to a second address for the receiving user, wherein the second address has been registered with a forwarding address server, the method comprising the steps of:

sending an electronic message from a first electronic mail domain to the first address at a second electronic mail domain;

determining in the second domain that the first address is no longer valid;

automatically sending a query from the second domain to the forwarding address server to determine a new address associated with the first address, and wherein the forwarding address server stores the first address in association with the second address;

returning the second address to the second domain; and thereafter automatically sending the electronic message to the second address.

2. The method of claim 1, the method further including the step of:

creating the electronic message by a sending user using an electronic mail program having an address book, the address book including the first address for the receiving user; and automatically sending a message to the sending user, the message including the second address for the receiving user, so that the sending user is able to manually update the address book with the second address.

3. The method of claim 1, the method further including the step of:

creating the electronic message on a computer system using an electronic mail program having an address book, the address book including the first address for the receiving user;

automatically sending the second address for the receiving user to the computer system; and automatically updating the address book with the second address.

4. The method of claim 1, wherein the forwarding address server is located in a third domain.

5. The method of claim 1, wherein the second domain includes an e-mail server, and wherein the e-mail server performs the step of automatically sending the electronic message to the second address.

6. The method of claim 1, wherein the first domain includes a first e-mail server, wherein the second domain includes a second e-mail server, the method further including the step of:

sending a message from the second e-mail server to the first e-mail server, the message including the second address, wherein the first e-mail server thereafter performs the step of automatically sending the electronic message to the second address.

7. A method of automatically resending an electronic message originally sent to a user at a first address that is now invalid to a second address for the user, wherein the second address has been registered with a forwarding address server, the method comprising the steps of:

sending an electronic message from a first electronic mail domain to the first address at a second electronic mail domain;

returning a message to the first domain indicating that the first address is no longer valid;

automatically sending a query from the first domain to the forwarding address server to determine a new address associated with the first address, and wherein the forwarding address server stores the first address in association with the second address;

returning the second address to the first domain; and thereafter automatically sending the electronic message to the second address.

8. The method of claim 7, the method further including the step of:

creating the electronic message by a sending user using an electronic mail program having an address book, the address book including the first address for the receiving user; and automatically sending a message to the sending user, the message including the second address for the receiving user, so that the sending user is able to manually update the address book with the second address.

9. The method of claim 7, the method further including the step of:

creating the electronic message on a computer system using an electronic mail program having an address book, the address book including the first address for the receiving user;

automatically sending the second address for the receiving user to the computer system; and automatically updating the address book with the second address.

10. The method of claim 7, wherein the forwarding address server is located in a third domain.

11. The method of claim 7, wherein the first domain includes an e-mail server, and wherein the e-mail server performs the step of automatically sending the electronic message to the second address.

12. A method of automatically resending an electronic message originally sent to a receiving user at a destination address that is now invalid to a new address for the receiving user, wherein the new address has been registered with an address server, the method comprising the steps of:

a) creating an electronic message on a computer system, the electronic message having a first destination address;

b) sending the electronic message to a first server;

c) sending the electronic message from the first server to a second server associated with the destination address;

d) determining in the second server that the destination address is not valid; and thereafter e) automatically sending a query to the address server to determine a new address associated with the destination address, wherein the address server stores the destination address in association with the new address;

f) returning the new address; and thereafter g) automatically sending the electronic message to the new address.

13. The method of claim 12, further including the step of sending a first message from the second server to the first server indicating that the destination address is not valid.

14. The method of claim 13, wherein the first server performs steps e) and g).

15. The method of claim 13, wherein the first server forwards the first message to the computer system.

16. The method of claim 12, wherein the second server performs steps e) and g).

17. The method of claim 12, wherein the step of creating the electronic message includes using a mail program on the computer system, the mail program having an address book including the destination address for the receiving user, the method further including the step of sending the new address for the receiving user to the computer system.

18. The method of claim 17, further including the step of automatically updating the address book with the new address for the receiving user.

19. The method of claim 12, wherein the address server is located in a first domain different from said first and second servers.

20. An address server having an address database for storing old e-mail addresses in association with new e-mail addresses for registered users, wherein when the address server receives a query from an e-mail server requesting a new e-mail address associated with an old e-mail address for a first user, if the first user is registered with the address server, the server searches the database for the old address and returns the new address for the first user to the e-mail server.

21. An e-mail server for receiving and sending electronic messages, wherein the e-mail server is configured to automatically send a request to an address server, which stores old e-mail addresses in association with new e-mail addresses for registered users, when the e-mail server receives a first electronic message from a first computer for a destination address that is no longer valid, and wherein the request requests a new address associated with the destination address.

\* \* \* \* \*